US006796017B2

(12) United States Patent
Harding

(10) Patent No.: US 6,796,017 B2
(45) Date of Patent: Sep. 28, 2004

(54) SLOT CORE TRANSFORMERS

(75) Inventor: Philip A. Harding, Palos Verdes, CA (US)

(73) Assignee: M-Flex Multi-Fineline Electronix, Inc., Anaheim, CA (US)

( * ) Notice: Subject to any disclaimer, the term of this patent is extended or adjusted under 35 U.S.C. 154(b) by 0 days.

(21) Appl. No.: 10/431,667

(22) Filed: May 8, 2003

(65) Prior Publication Data

US 2003/0206088 A1 Nov. 6, 2003

Related U.S. Application Data

(62) Division of application No. 09/863,028, filed on May 21, 2001, now Pat. No. 6,674,355.
(60) Provisional application No. 60/205,511, filed on May 19, 2000.

(51) Int. Cl.[7] ................................................ H02K 15/16
(52) U.S. Cl. ............................................ 29/596; 29/605
(58) Field of Search .......................... 29/596, 597, 598, 29/602.1, 603.04, 603.15, 603.23, 603.24, 603.25, 603.26, 605, 606; 336/212, 200, 223

(56) References Cited

U.S. PATENT DOCUMENTS

| | | | | |
|---|---|---|---|---|
| 3,684,991 A | | 8/1972 | Trump et al. | |
| 4,172,245 A | * | 10/1979 | Link | 336/197 |
| 4,383,235 A | | 5/1983 | Layton et al. | |
| 5,177,460 A | * | 1/1993 | Dhyanchand et al. | 336/12 |
| 5,257,000 A | | 10/1993 | Billings et al. | |
| 5,481,238 A | * | 1/1996 | Carsten et al. | 336/214 |
| 5,514,337 A | | 5/1996 | Groger et al. | |
| 5,525,951 A | * | 6/1996 | Sunano et al. | 336/160 |
| 5,532,667 A | | 7/1996 | Haertling et al. | |
| 6,014,071 A | * | 1/2000 | Onishi et al. | 336/170 |
| 6,040,753 A | * | 3/2000 | Ramakrishnan et al. | 336/223 |
| 6,148,500 A | | 11/2000 | Krone et al. | |
| 6,262,463 B1 | | 7/2001 | Miu et al. | |
| 6,270,375 B1 | | 8/2001 | Cox et al. | |
| 6,278,354 B1 | | 8/2001 | Booth | |
| 6,329,606 B1 | | 12/2001 | Freyman et al. | |
| 6,383,033 B1 | | 5/2002 | Politsky et al. | |

FOREIGN PATENT DOCUMENTS

| | | |
|---|---|---|
| EP | 0 033 441 A | 8/1981 |
| EP | 0 262 329 A | 4/1988 |
| TW | 432412 | 5/2001 |

OTHER PUBLICATIONS

Copy of U.S. patent application Ser. No. 10/659,797, Filed Sep. 11, 2003.

* cited by examiner

*Primary Examiner*—I Cuda Rosenbaum
*Assistant Examiner*—Stephen Kenny
(74) *Attorney, Agent, or Firm*—Knobbe, Martens Olson & Bear LLP

(57) ABSTRACT

Slot core inductors and transformers and methods for manufacturing same including using large scale flex circuitry manufacturing methods and machinery for providing two mating halves of a transformer winding. One winding is inserted into the slot of a slot core and one winding is located proximate to the exterior wall of the slot core. These respective halves are joined together using solder pads or the like to form continues windings through the slot and around the slotted core.

3 Claims, 19 Drawing Sheets

SLOT CORE TRANSFORMERS

RELATED APPLICATIONS

This application is a divisional of U.S. patent application Ser. No. 09/863,028, filed on May 21, 2001 now U.S. Pat. No. 6,674,355, which claims the benefit of U.S. Provisional Application No. 60/205,511 filed May 19, 2000.

FIELD OF THE INVENTION

This invention relates to miniature inductors and transformers. Transformers constructed in accordance with this invention have a number of applications in the electronics, telecommunications and computer fields.

SUMMARY OF THE INVENTION

The preferred embodiments of the present invention utilize a slotted ferrite core and windings in the form of flex circuits supporting a series of spaced conductors. A first portion of the primary and secondary windings of a transformer are formed as one flex circuit. The remainder of the primary and secondary windings are formed as a second flex circuit. Connection pads are formed on both flex circuits. One of the flex circuits is positioned within the opening or slot of ferrite core, the other flex circuit is positioned in proximity to the outside of the ferrite core so that the connection pads of both flex circuits are in juxtaposition. These juxtaposed pads of the two flex circuits are respectively bonded together to form continuous windings through the slot and around the core.

One significant feature of the invention is that the flexible nature of the flex circuit facilitates construction of a plurality of different transformer and inductor configurations. Thus, in one preferred embodiment, one of the flex circuits is folded along a plurality of fold lines to accommodate the physical configuration of the slotted core. In another embodiment, the flex circuit is passed through the slot in the ferrite core without folding.

Inductors and transformers constructed in accordance with the preferred embodiments of this invention offer improved heat removal, smaller size, superior performance, and excellent manufacturing repeatability. In addition, inductors and transformers constructed in accordance with the preferred embodiment of this invention are surface mountable without the need for expensive lead frame dies or pinning tools.

BRIEF DESCRIPTION OF THE DRAWINGS

FIG. 2(*b*) is a side view of an inductor or transformer constructed in accordance with this invention attached to a thermal heat sink;

The square cross-hatching in FIGS. 10–13, 19 and 20 is not a structural element or indicator of a cross-section but only indicates a surface plane of the flex panel or core.

DETAILED DESCRIPTION OF THE PREFERRED EMBODIMENTS

Figure 7:
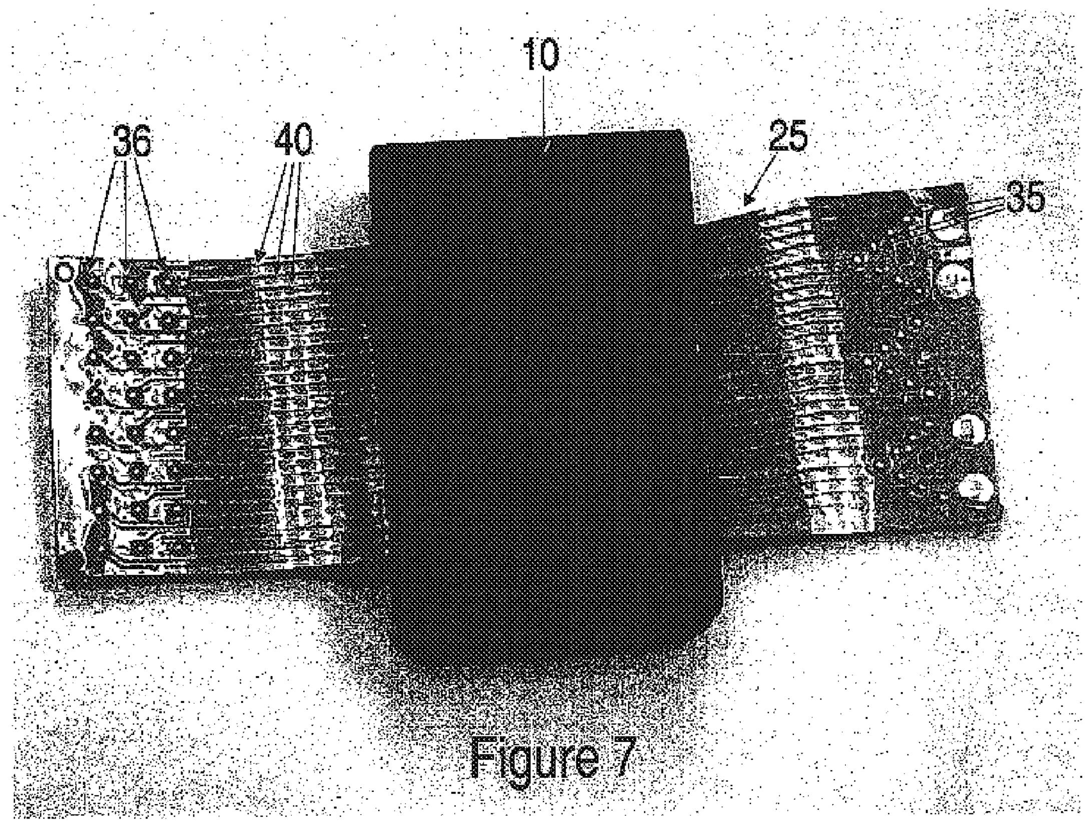
FIG. 7 is an enlarged photograph showing a top elevational view of the transformer shown in FIG. 4.
Figure 8:
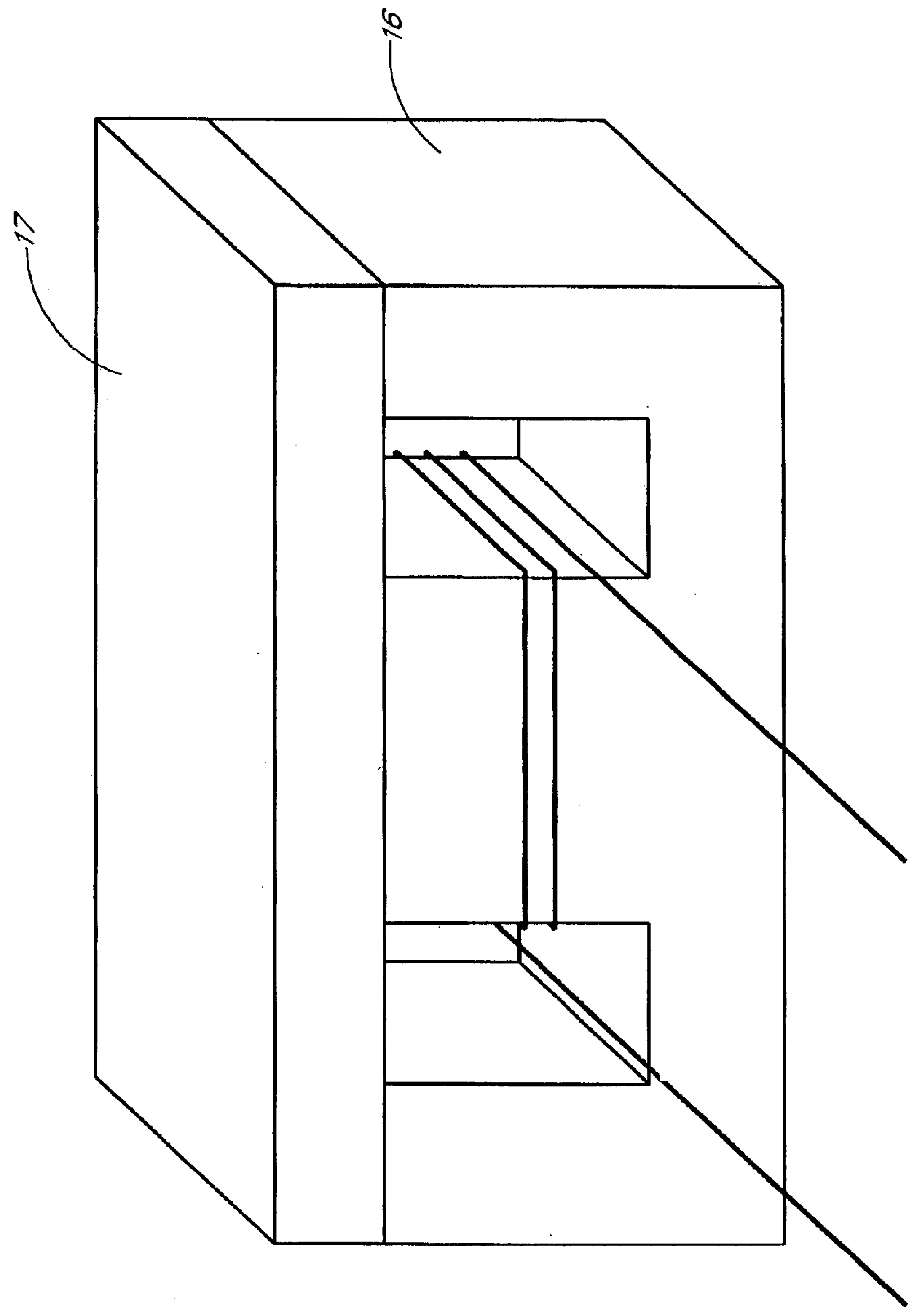
FIG. 8 is a perspective view of a conventional E-core inductor or transformer.

Referring to FIGS. 1 through 7, one preferred embodiment includes a one-piece slot ferrite core 10 having an elongated opening or slot 15 extending from one side 20 to the opposite side 21. Another preferred embodiment includes a two-piece E-core as shown in FIG. 8 having a generally E-shaped base 116 and cap 17 with an air gap between the base 16 and cap 17. The cap 17 may also have "legs down E" configuration that mate with the "legs up D" core 16. Other typical core configurations are shown in FIG. 18.

Figure 4:
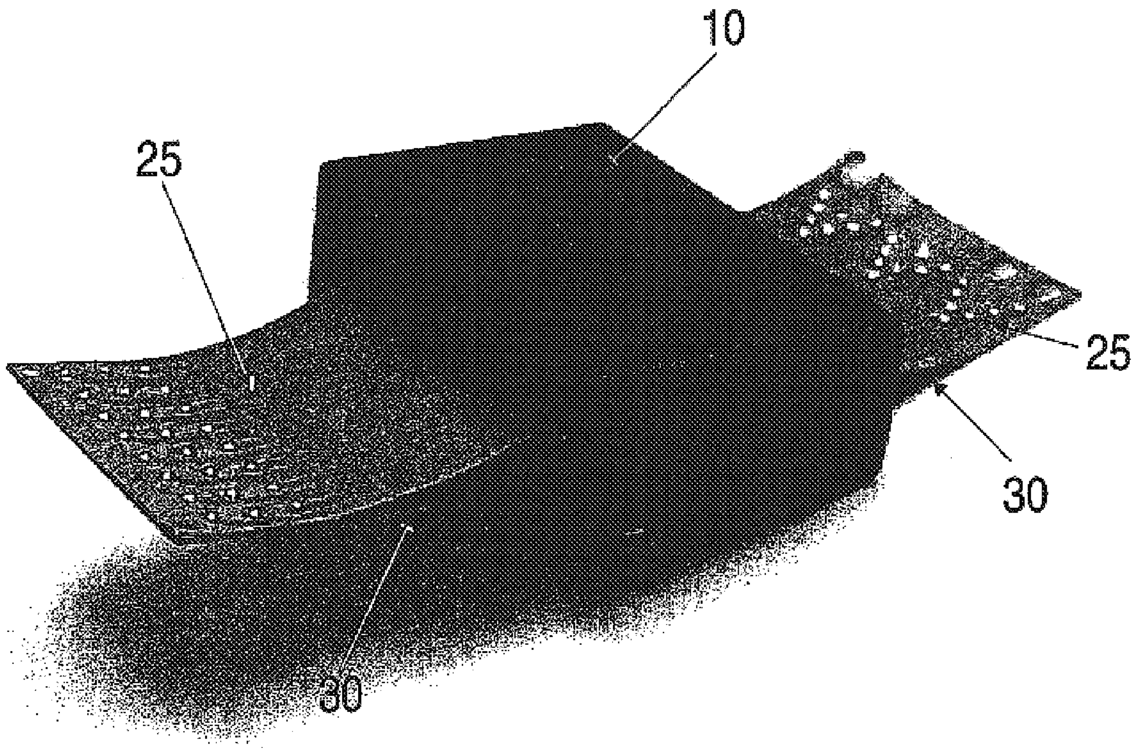
FIG. 4 is an enlarged photograph showing perspectively a slot core transformer constructed in accordance with one embodiment of the invention.
Figure 5:
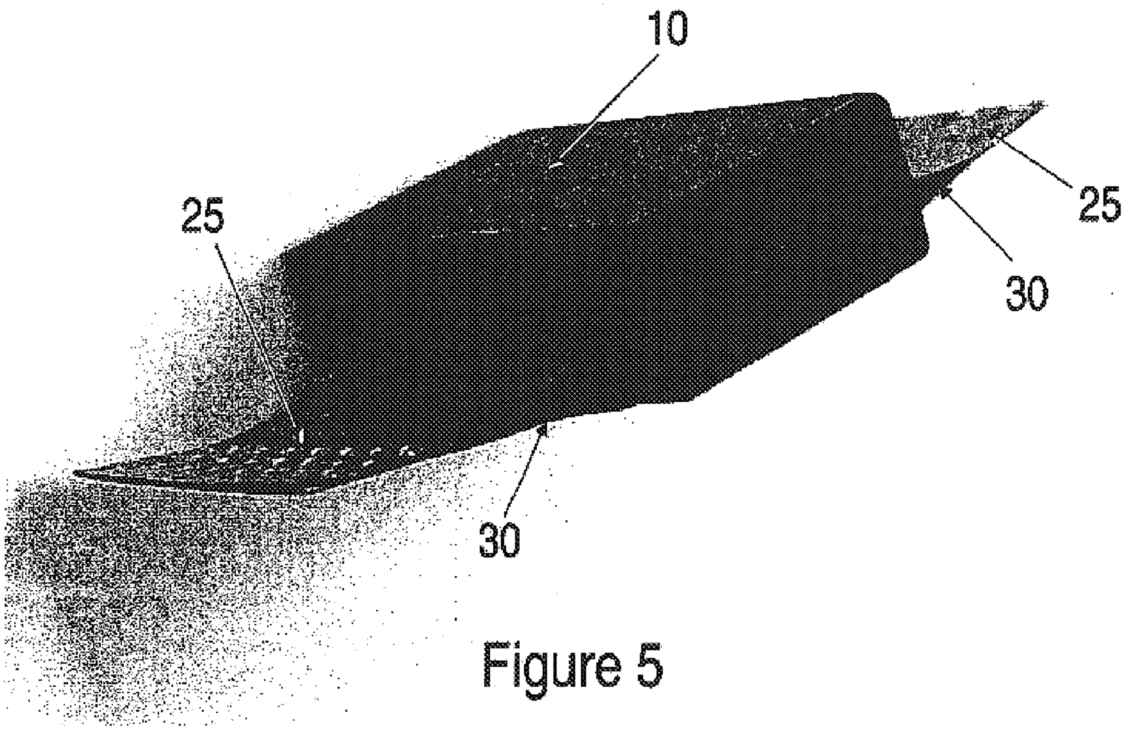
FIG. 5 is an enlarged photograph of another perspective view of the slot core transformer shown in FIG. 4.
Figure 6:
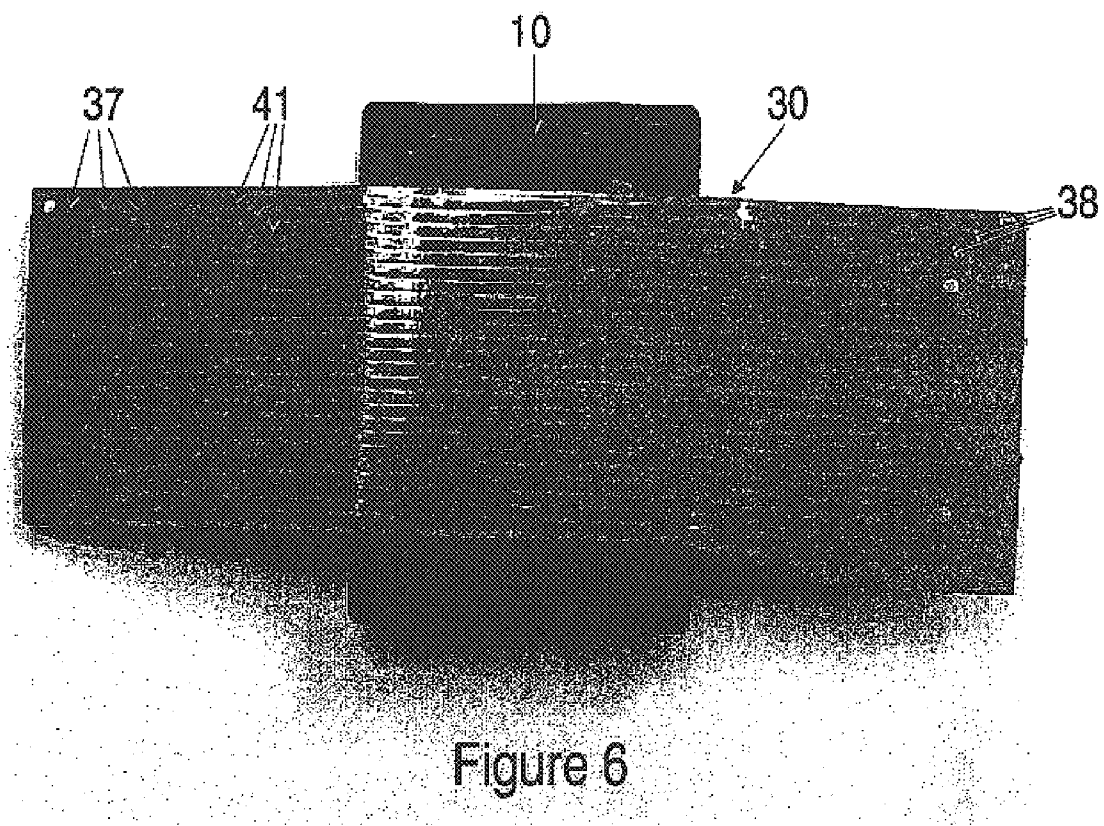
FIG. 6 is an enlarged photograph showing a bottom elevational view of the transformer shown in FIG. 4.

A significant feature of the preferred embodiments of this invention is that the windings are formed from easily manufactured flex circuits. As shown in FIGS. 4, 5, and 7, an upper flex circuit 25 is threaded lengthwise completely through the slot 15.

Figure 1:
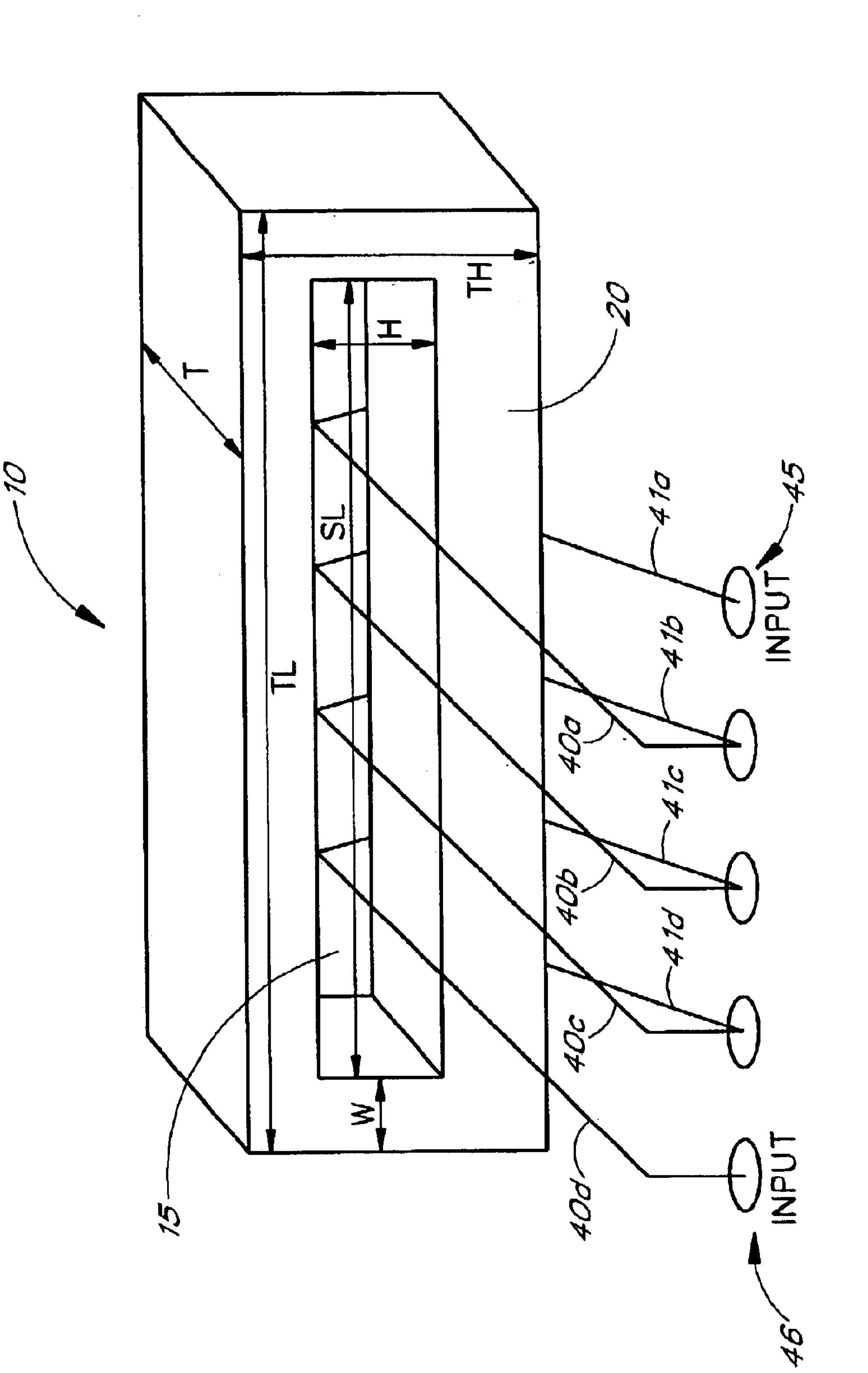
FIG. 1 is a perspective view in partial schematic form of one preferred embodiment of the invention.

A lower flex circuit 30 resides proximate to the core 10. Connecting pads 35, 36 on the upper flex circuit 25 attach to mating pads 37, 38 on the lower flex circuit 30. As described below, these pads are electronically connected to respective ends of the flex circuitry conductors 40 of the upper flex circuit and flex circuitry conductors 41 of the lower flex circuit 30. Connecting these pads effectuates complete electrical windings through and across the core 10. For simplicity, FIG. 1 schematically illustrates a four-turn inductor with input leads 45, 46 on one side of the core 10. Thus, leads 40*a*, 40*b*, 40*c* and 40*d* are located in an upper flex circuit and leads 41*a*, 41*b*, 41*c* and 41*d* are located in the lower flex circuit. As described in more detail below, multiple winding transformers are similarly constructed.

Figure 3A:
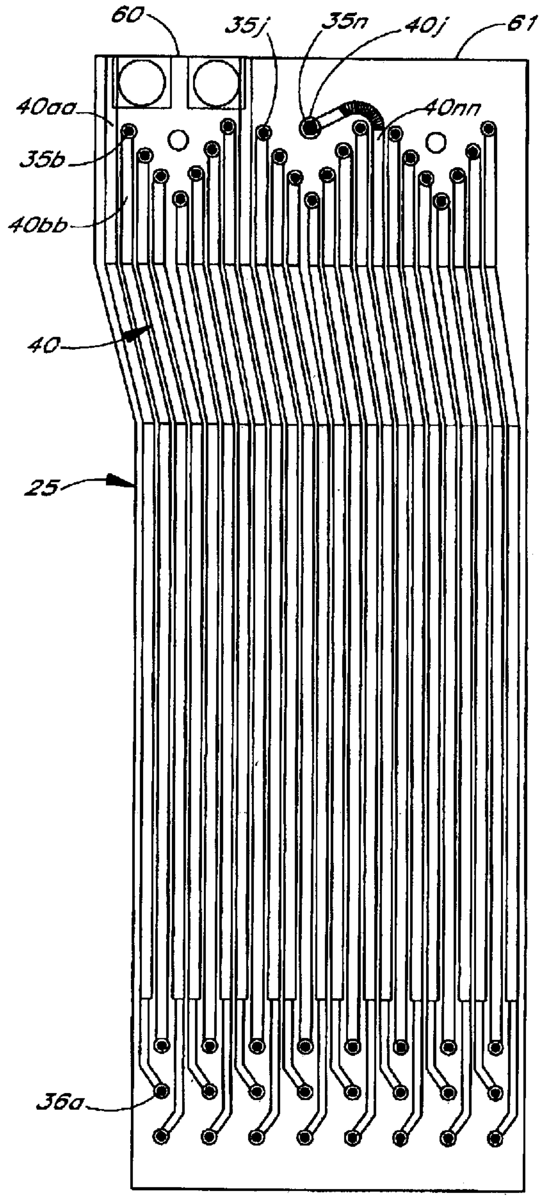
FIGS. 3(*a*) and 3(*b*) are greatly enlarged elevational views of the upper and lower flex circuits used to construct a transformer in accordance with this invention.
Figure 3B:
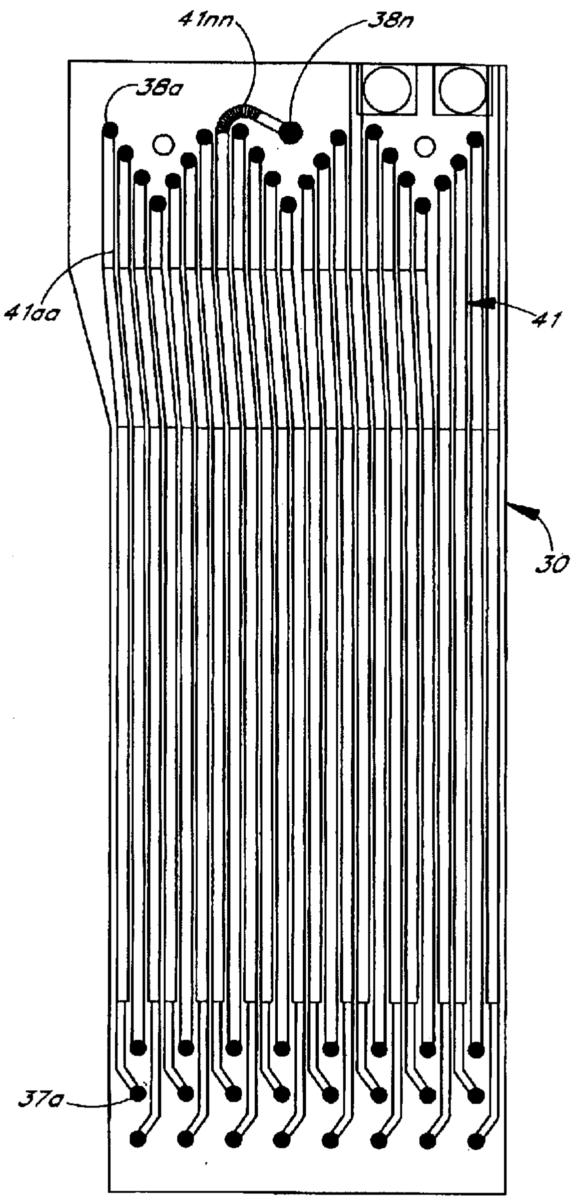

FIGS. 3*a* and 3*b* illustrate the connection of the flex circuits 25 and 30 for a transformer having both a primary winding 60 and a secondary winding 61 as shown. Each flex circuit respectively includes a series of spaced discrete electrical conductors 40 and 41. In the preferred embodiment, each of the discrete conductors 40 and 41 are generally linear but offset at one end to provide electrical windings around the core 10 when the respective pads 35, 36, 37 and 38 are bonded together to assume the configuration shown, for example, in FIGS. 4 through 7. Each of the discrete conductor leads 40, 41 terminate in a pad 35, 36, 37 and 38 which interconnect the upper and lower flex circuits as described above. Starting with primary conductor 40*aa* as shown in FIG. 3(*a*), this conductor terminates in pad 36*a*. Pad 36*a* is electrically bonded to juxtaposed pad 37*a* in flex current 30. Electrically connecting pads 36*a* and 37*a* effectively returns the transformer "winding" through the core slot 15 by virtue of lead 41*aa* on flex circuit 30. Lead 41*aa* terminates in pad 38*a* which is joined to pad 35*b* of the upper flex circuit 25. Pad 35*b* is connected to one end of the conductor 40*bb* immediately adjacent to conductor 40*aa*.

In similar manner, the remaining primary windings are formed. Likewise, bonding the pads together creates a secondary winding starting with pad 35*j* and conductor 40 in upper flex circuit 25.

A feature of the preferred embodiments of the invention is that the primary and secondary windings are easily provided by forming conductor group and pad locations. For example, referring to FIGS. 3(*a*) and 3(*b*), a continuous primary winding is formed on opposite sides of the flex circuit by pads 35*n* and 38*n* connected to bent ends of respective conductors 40*nn* and 41*nn*. In similar manner, rather than being connected by pads 35*n* and 38*n*, the conductors 40*nn* and 41*nn* could be connected to separate terminals thus providing two separate windings on the transformer core.

FIGS. 9A, 9B, and 10–17 illustrate another preferred embodiment of the invention. In this embodiment, one of the flex circuit panels is folded along plural bend lines to accommodate the magnetic core.

By way of specific example, the construction of a simple two winding transformer having six primary turns and a single secondary turn is illustrated. However, it will be apparent that multiple turn primary and secondary windings can be constructed in accordance with this invention.

Figure 9A:
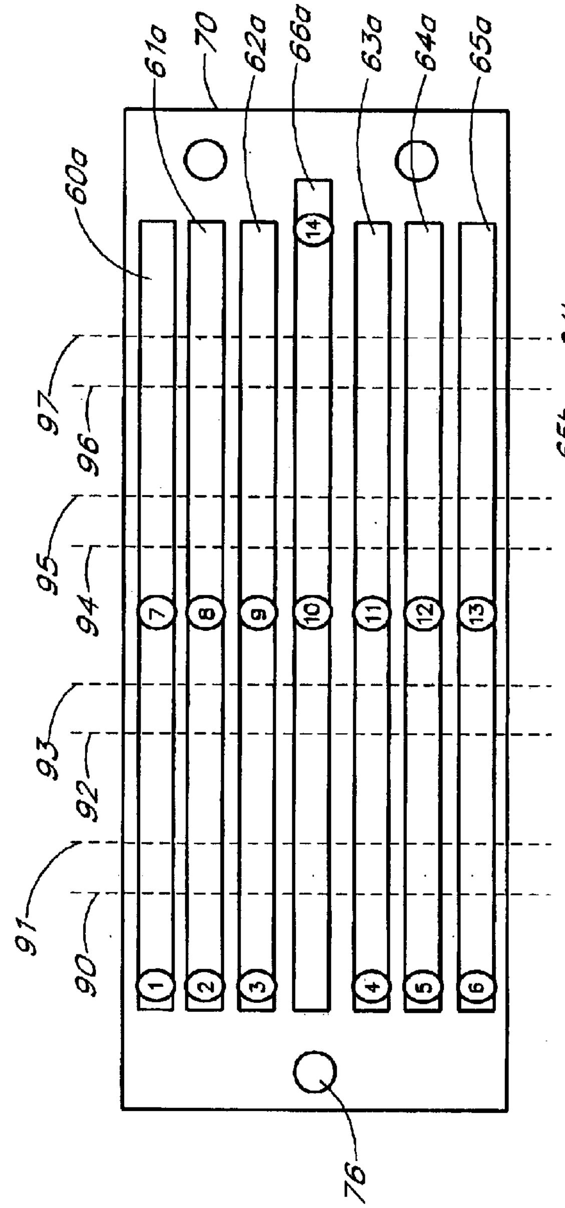
FIG. 9A is an enlarged top view of a bottom portion of a primary and secondary winding formed as a flex circuit for another preferred embodiment of the invention.

Referring now to FIG. 9A, the six primary turns include flex circuit conductors 60*a*, 61*a*, 62*a*, 63*a*, 64*a*, and 65*a* formed in the bottom flex circuit 70 and flex circuit conductors 60*b*, 61*b*, 62*b*, 63*b*, 64*b*, and 65*b* formed in the top flex circuit 75. These conductors are offset sequentially such that, as described below, the bottom conductors will connect to the top conductors via solder pads. The single secondary turn is provided by flex circuit conductor 66*a* in the bottom flex circuit 70 and flex circuit conductor 66*b* in the top flex circuit 75. The secondary is advantageously centrally located between the primary circuit conductors to provide symmetry between the primary and secondary windings of a transformer.

As in the embodiment of FIGS. 1–7 described above, a plurality of solder pads numbered 1 through 14 are respectively associated with these conductors 60*a*–66*a* and 60*b*–66*b*. Each flex circuit also advantageously includes tooling holes 76 for precisely aligning the top and bottom flex circuits, as described below. The bottom flex is made longer than the top flex so that the two circuits become equal in length after the bottom flex is bent into shape as shown in FIG. 10 and described below. The circuits and solder pads shown in FIGS. 9A and 9B are a simplified construction to illustrate the principles but many other circuit patterns are possible depending upon the particular transformer or inductor design.

Figure 9B:
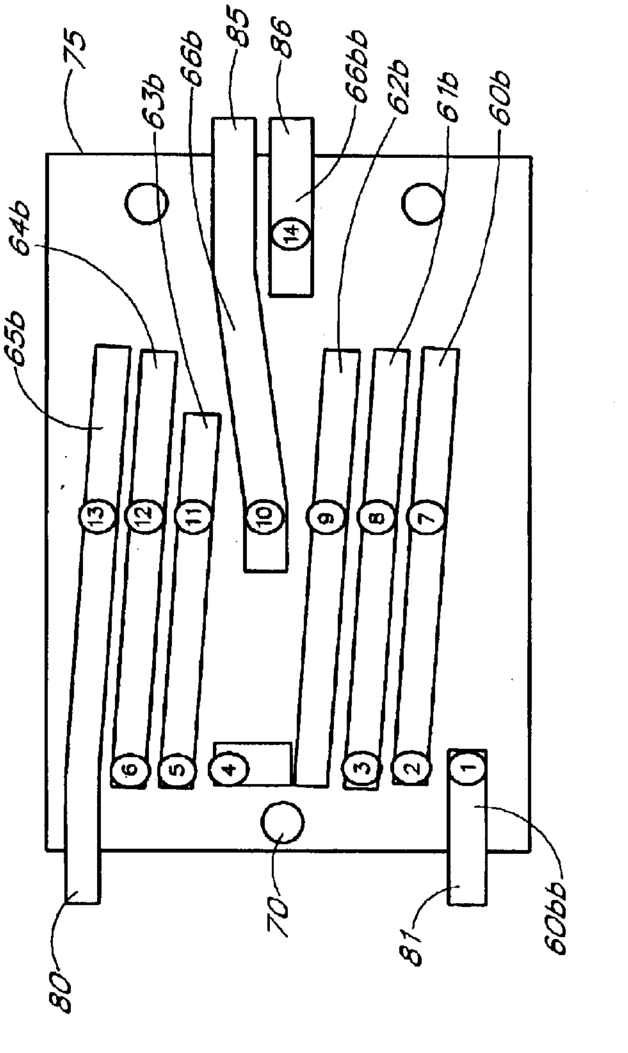
FIG. 9B is an enlarged top view of a top portion of a primary and secondary winding formed as a flex circuit.
Figure 10:
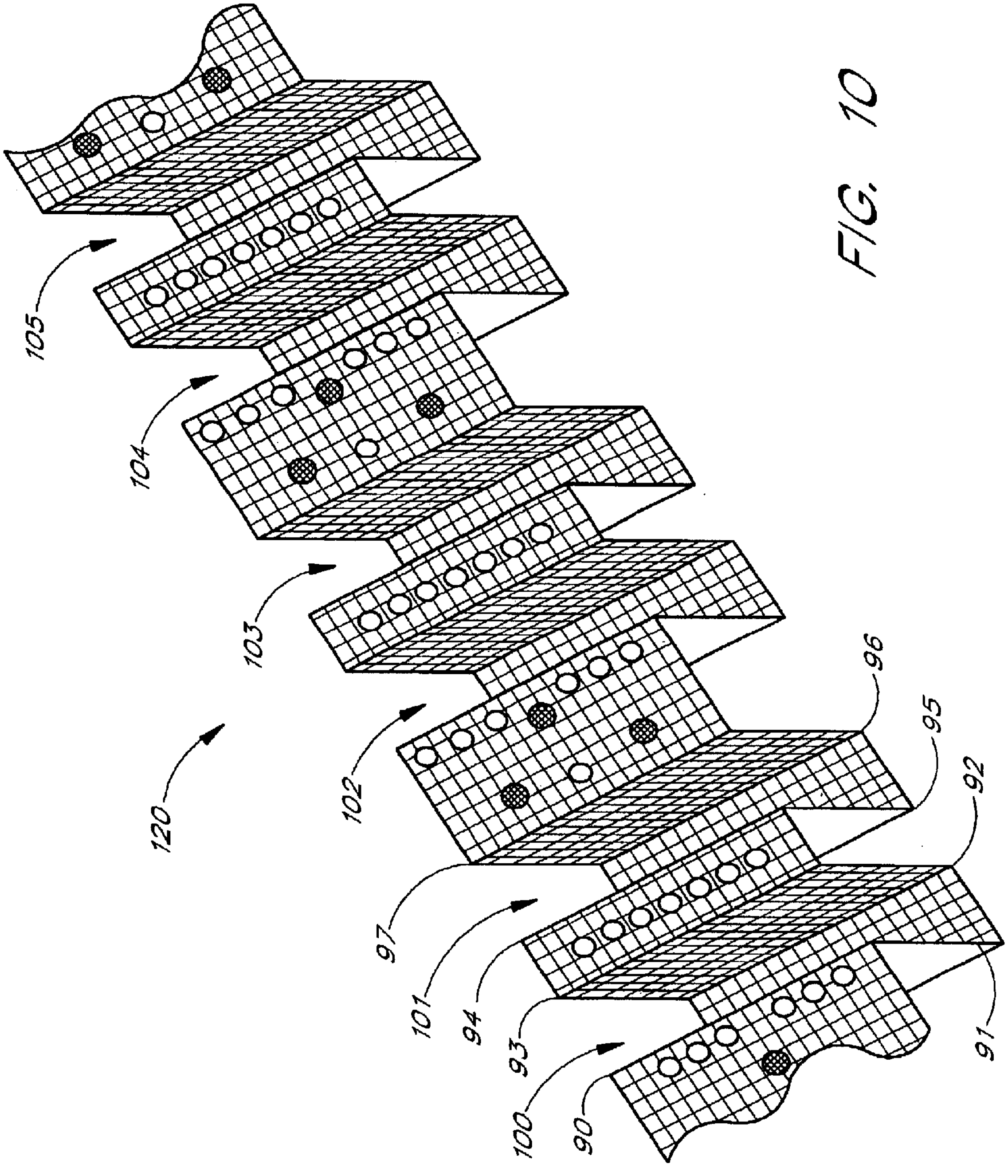
FIG. 10 is an enlarged perspective view of the bottom portion of FIG. 9A folded to accommodate a magnetic core.

In addition, as shown in FIG. 9B, flex circuit 75 advantageously includes primary terminals 80, 81, terminal 80 being formed at the end of conductor 65*b* and terminal 81 being formed at the end of a conductor 60*bb* having a solder pad 1 which is ultimately joined to pad 1 of conductor 60*a*. Flex circuit also advantageously includes secondary terminals 85, 86, the terminal 85 being formed at the end of conductor 66*b* and terminal 86 being formed at the end of flex conductor 66*bb* having a solder pad 14 which is ultimately bonded to solder pad 14 of conductor 66*a* of the bottom flex conductor.

The next stage of manufacture includes folding the bottom flex strip 70 along the bend lines 90–97 of FIG. 9A. Advantageously, a plurality of bottom and top flex conductors are manufactured on sheets using mass production techniques. As described below, a "chain" or series of bottom and top flex strips are manufactured and later separated. A portion of a bottom "chain" 120, after folding along the bend lines 90–97, is illustrated in FIG. 10. In the portion of the section shown in FIG. 10, the flex circuit 120 is folded into a shape having a total six cavities 100, 101, 102, 103, 104, and 105 comprised of three sets of two cavities each. The solder pads 1–13 face upwardly.

Figure 11:
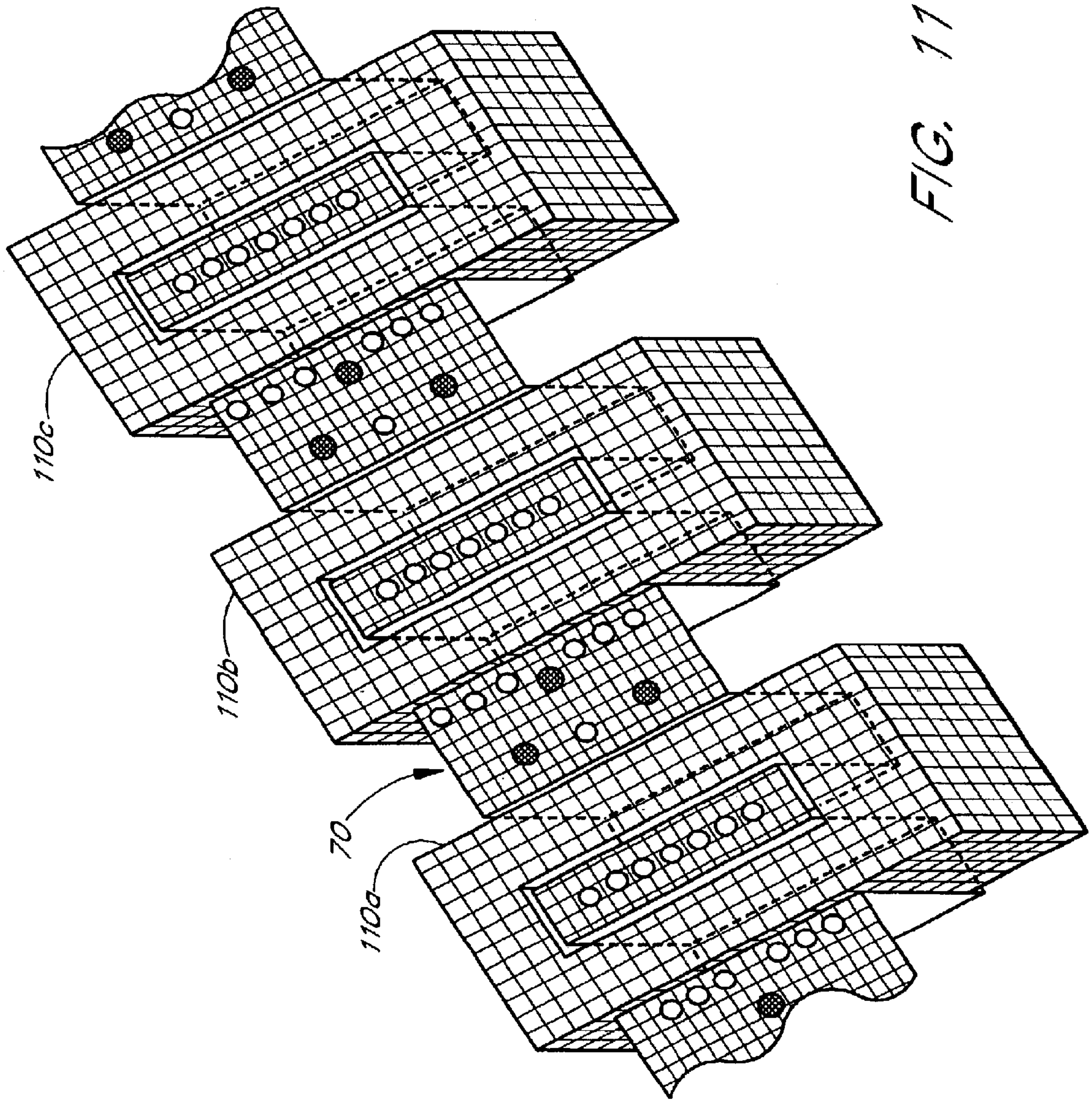
FIG. 11 is an enlarged perspective view illustrating the magnetic cores inserted into the cavities formed by folding the bottom flex circuit of FIG. 9A.

As shown in FIG. 11, three slotted magnetic cores 110*a*, 110*b*, and 110*c* are placed into the three sets of cavities with a suitable adhesive to retain them in place. Cores 110 may be one-piece ferrite cores as shown at 10 in FIG. 1. Alternatively, the cores may be two-piece cores as described below.

Figure 12:
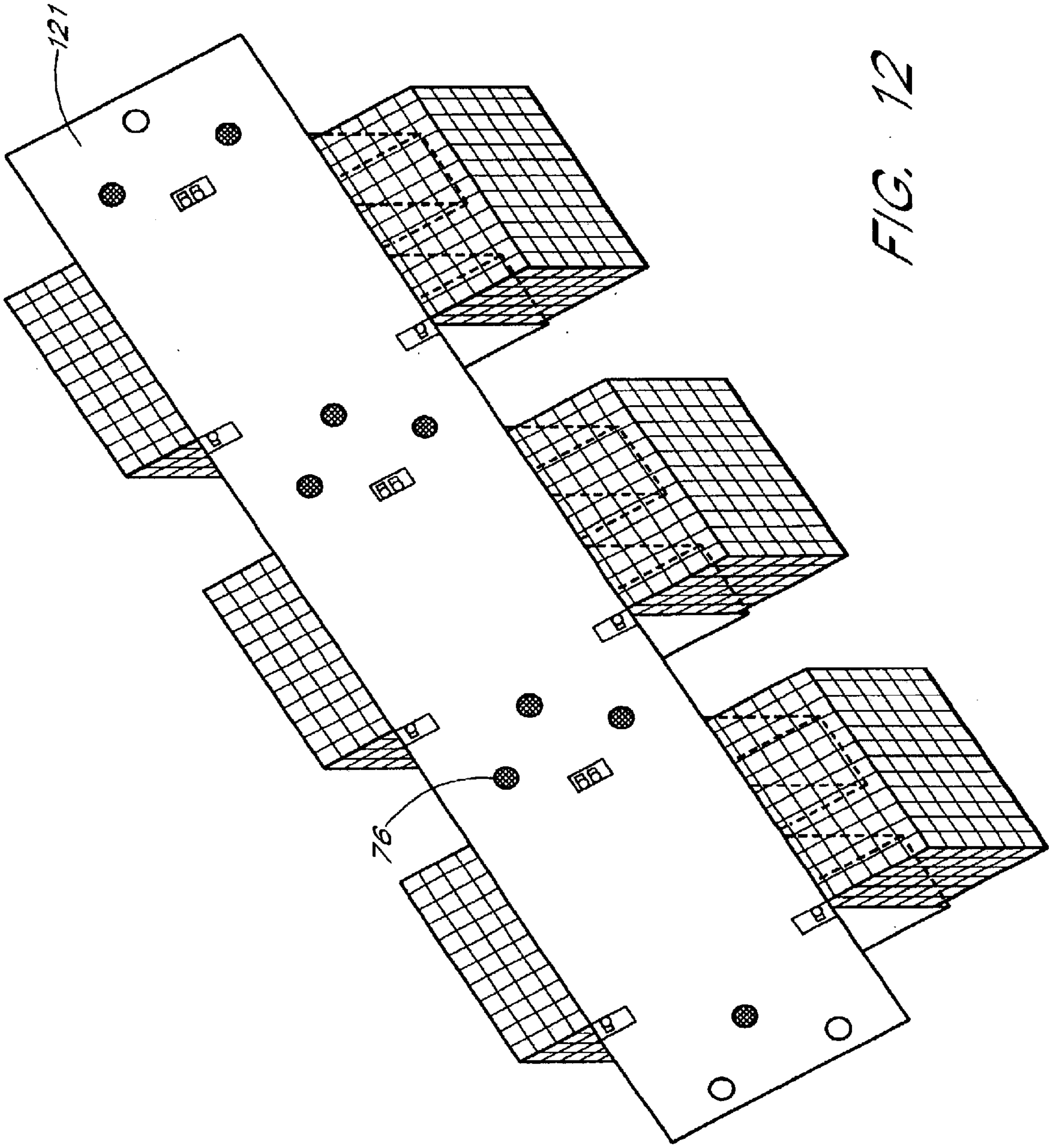
FIG. 12 is an enlarged perspective view showing the application of the top flex circuit of FIG. 9B to the bottom flex circuit and cores shown in FIG. 11.
Figure 13:
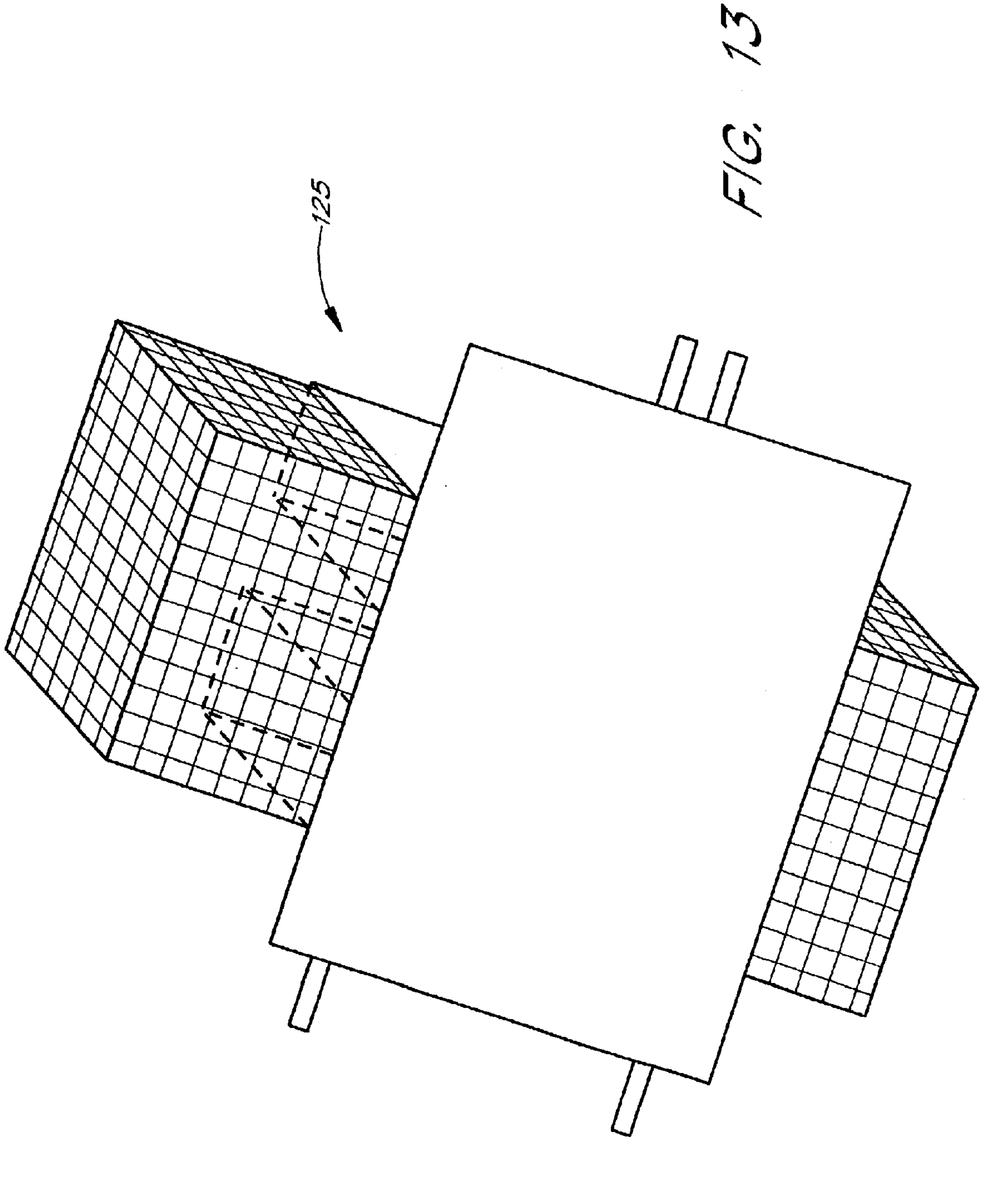
FIG. 13 is an enlarged perspective view illustrating an individual transformer constructed in accordance with FIGS. 9A, 9B, 10, 11, and 12.

The final stages of transformer construction are illustrated in FIGS. 12 and 13, FIG. 12 illustrating a flex strip 121 having a "chain" or series of top flex conductors placed face down over the assembly of FIG. 11. The tooling holes 76 are used to align the bottom and top strips to register the numbered solder pads 1–13 on both the bottom and top flex circuits. These respective pads are bonded together to create continuous turns of conductors around the three cores. Such bonding, for example, is advantageously provided using a solder reflow oven.

After bonding together of the respective solder pads 1–13, the individual transformer assemblies are separated to form individual transformers 125 as shown in FIG. 13.

Figure 14:
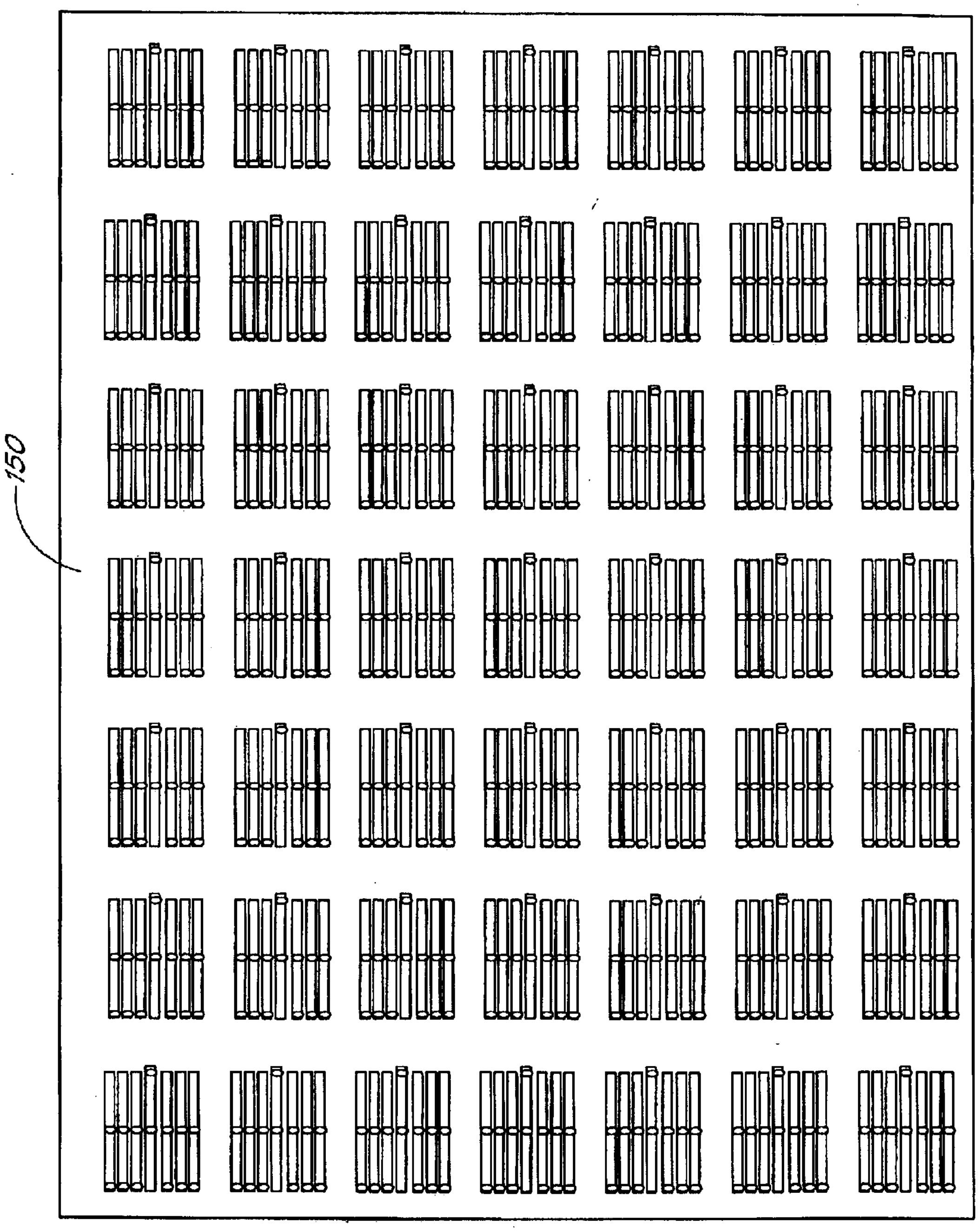
FIG. 14 is a top view of a flex panel showing the manner of manufacturing the bottom flex circuits in quantity.

The flex strip configurations shown in FIGS. 3–7 and 9A, 9B, 10, 11, and 12 are advantageously manufactured using conventional mass production techniques. FIG. 14 illustrates a copper plane having a multiplicity of the bottom flex circuits 70 shown in FIG. 9A. These circuits are adhered to a flex panel 150 made of a dielectric such as polyimide or other flexible materials. Such a panel can be fabricated by the ordinary processes used to construct a flex circuit. This picture shows a typical arrangement of 49 circuit arrangements grouped into 7 rows and 7 columns, with a number of copper paths per circuit. The number of circuits on the panel and the copper paths will vary depending upon the individual transformer or inductor design but a simplified arrangement is shown for ease of illustration.

After the circuit patterns are etched onto the panel 150 a protective cover is bonded over the copper with a suitable dielectric, as is typical of the methods used to build flex circuitry. This cover has access holes that exposes the copper in chosen locations to create the solder pads so that the bottom flex plane can be connected to a top flex plane as described subsequently. This cover can be a solder mask or a dielectric cover made of polyimide, polyester or other similar materials.

Figure 15:
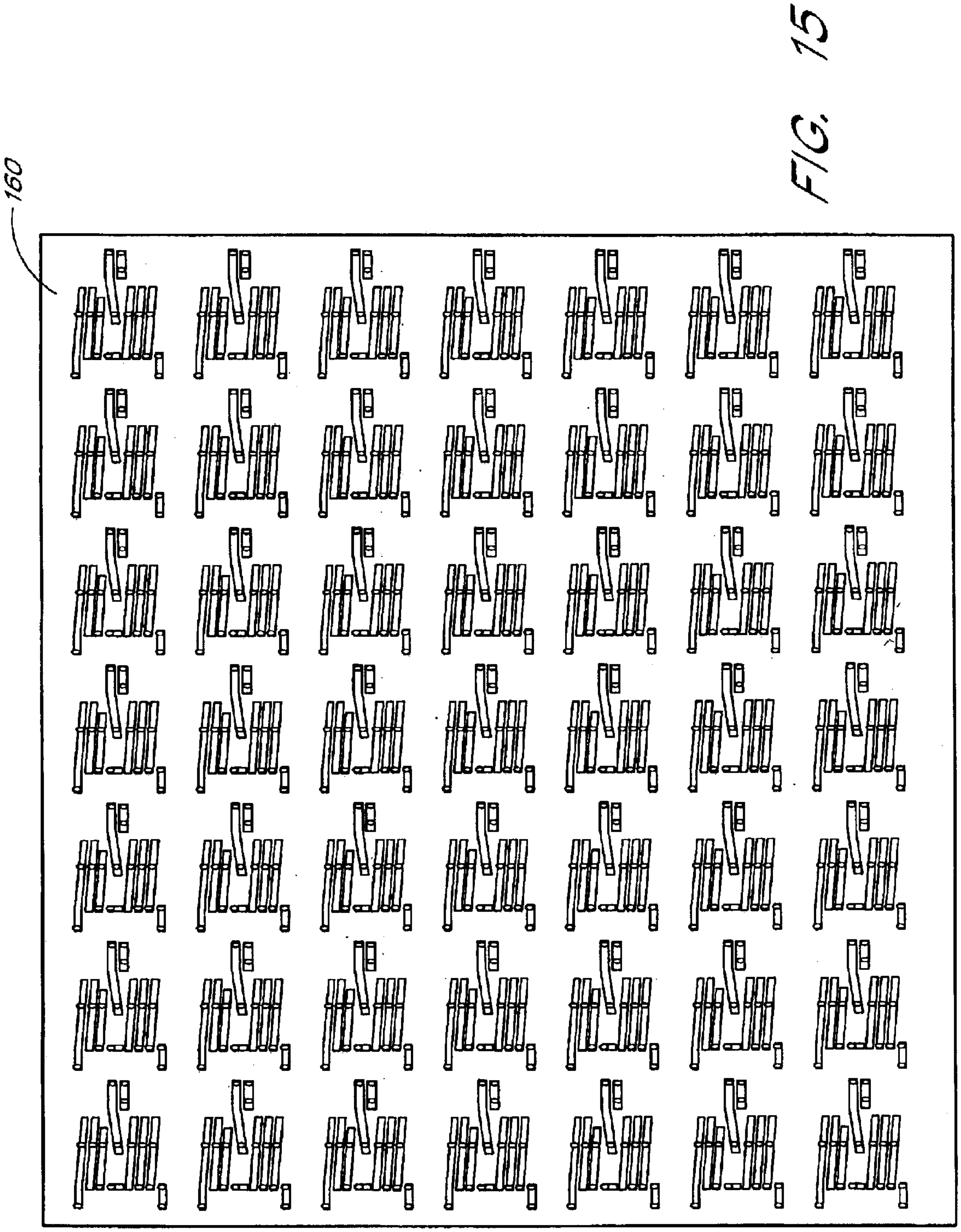
FIG. 15 is a top view showing the manufacturing of the top flex circuits in quantity.
Figure 16:
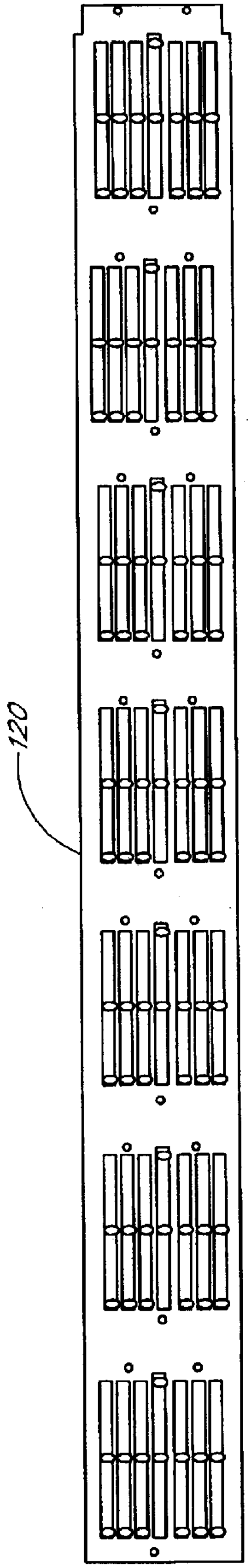
FIG. 16 illustrates the strip of bottom flex circuits cut from the sheet shown in FIG. 14.
Figure 17:
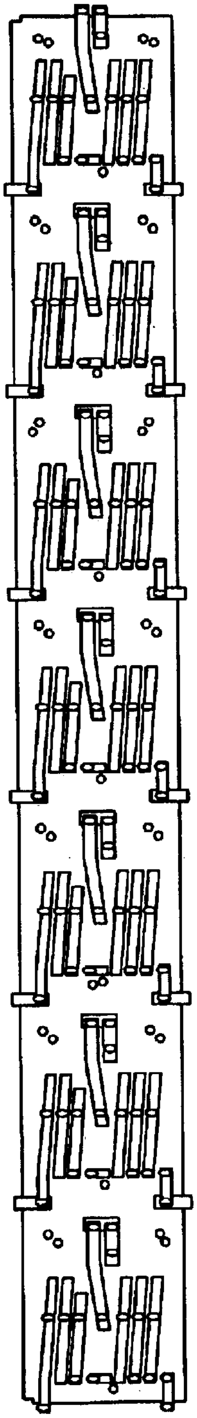
FIG. 17 illustrates a strip of top flex circuits cut from the sheet shown in FIG. 15.

FIG. 15 exhibits another copper plane having a multiplicity of top flex circuits 75 adhered to a flex panel 160 made of a dielectric such as polyimide or other flexible materials. Such a panel can also be fabricated by the ordinary processes used to construct flex circuitry as described above. This drawing shows a typical arrangement of 49 circuit arrangements grouped into 7 rows and 7 columns, with a number of copper paths per circuit. The number of circuits on the panel and the copper paths will vary depending upon the individual transformer or inductor design but a simplified arrangement is shown for ease of illustration. A suitable cover is advantageously bonded to the top flex plane 160 with chosen access holes exposing copper solder pads to be subsequently connected to the bottom flex plane circuits.

There are many alternative configurations that can be manufactured using the methods described herein.

In the configuration of FIGS. 9A, 9B, and 10–17, the bottom flex circuit 70 is folded as shown in FIG. 10 and flex-conductors in flex circuit 70 extend into the slot of the ferrite core. Another configuration of the invention includes two or more folded flex circuits. In one such embodiment, the cores reside in respective cavities formed by two folded flex circuits. In this alternative embodiment, conductors of two or more flex circuits can extend into the slot of the ferrite core to provide different transformer or inductor configurations.

Many alternative ferrite core shapes can be used in the fabrication. FIGS. 18A, 18B, 18C and 18D illustrate four typical cores. Thus, a one-piece slot core 10 of FIGS. 1 and 18A can be used in typical cores used for low current applications. Cores so constructed provide very efficient transformers. Losses are reduced due to the fact that there are no air gaps present in the core to reduce efficiency. High current power supply circuits such as switching power supplies normally require air gaps in the magnetic flux paths to eliminate magnetic saturation of the core. This invention provides air gaps very economically by using a two-piece slot core 200 shown in FIG. 18B. The required air gap separation between the two core parts is advantageously provided by the placement of a thin low cost film 205 along the sidewall of one of the cavities as shown in FIG. 19. This film can be added as part of the process of manufacturing the bottom flex plane.

Figure 18A:
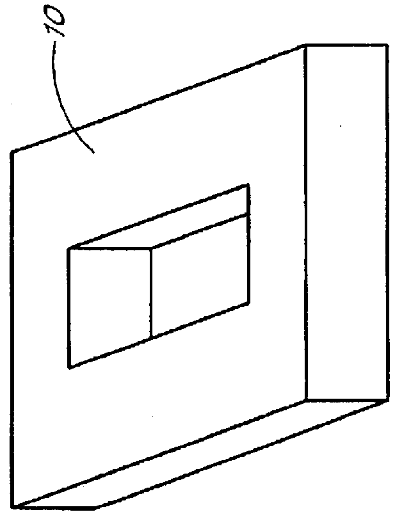
FIGS. 18A, 18B, 18C and 18D are perspective views illustrating different magnetic core configurations.
Figure 18B:
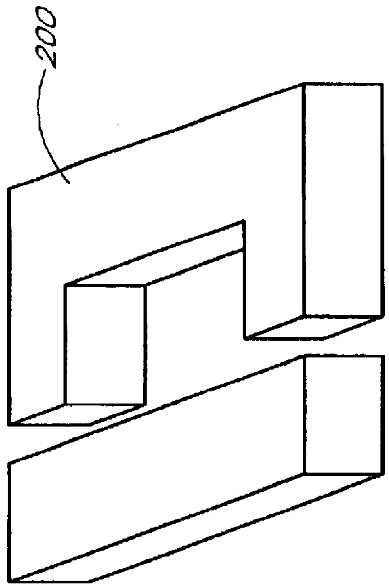
Figure 18C:
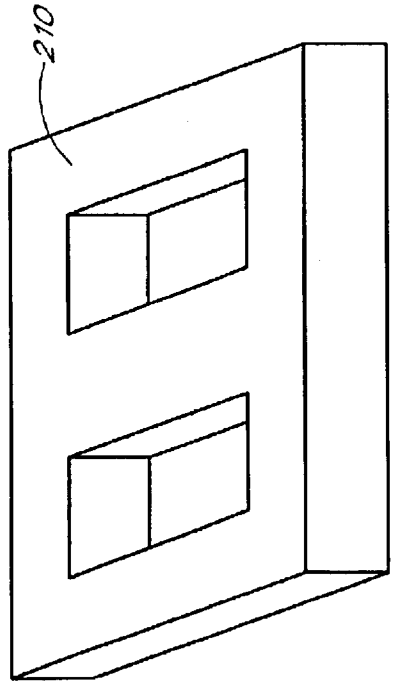
Figure 18D:
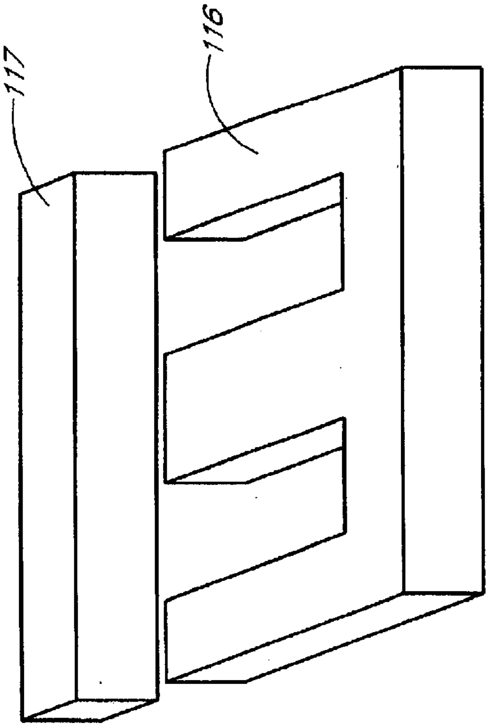
Figure 19:
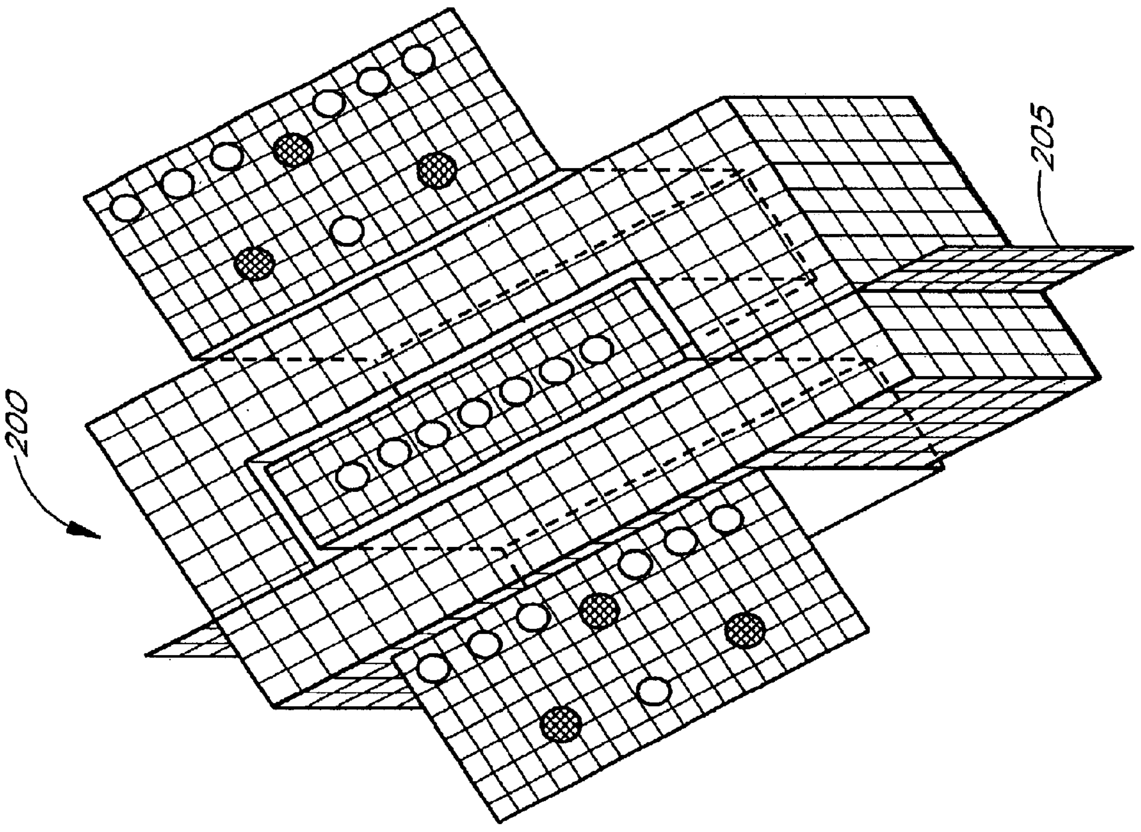
FIG. 19 is a perspective view illustrating the manner in which an air gap is formed using a two piece core and a dielectric film insert.
Figure 20:
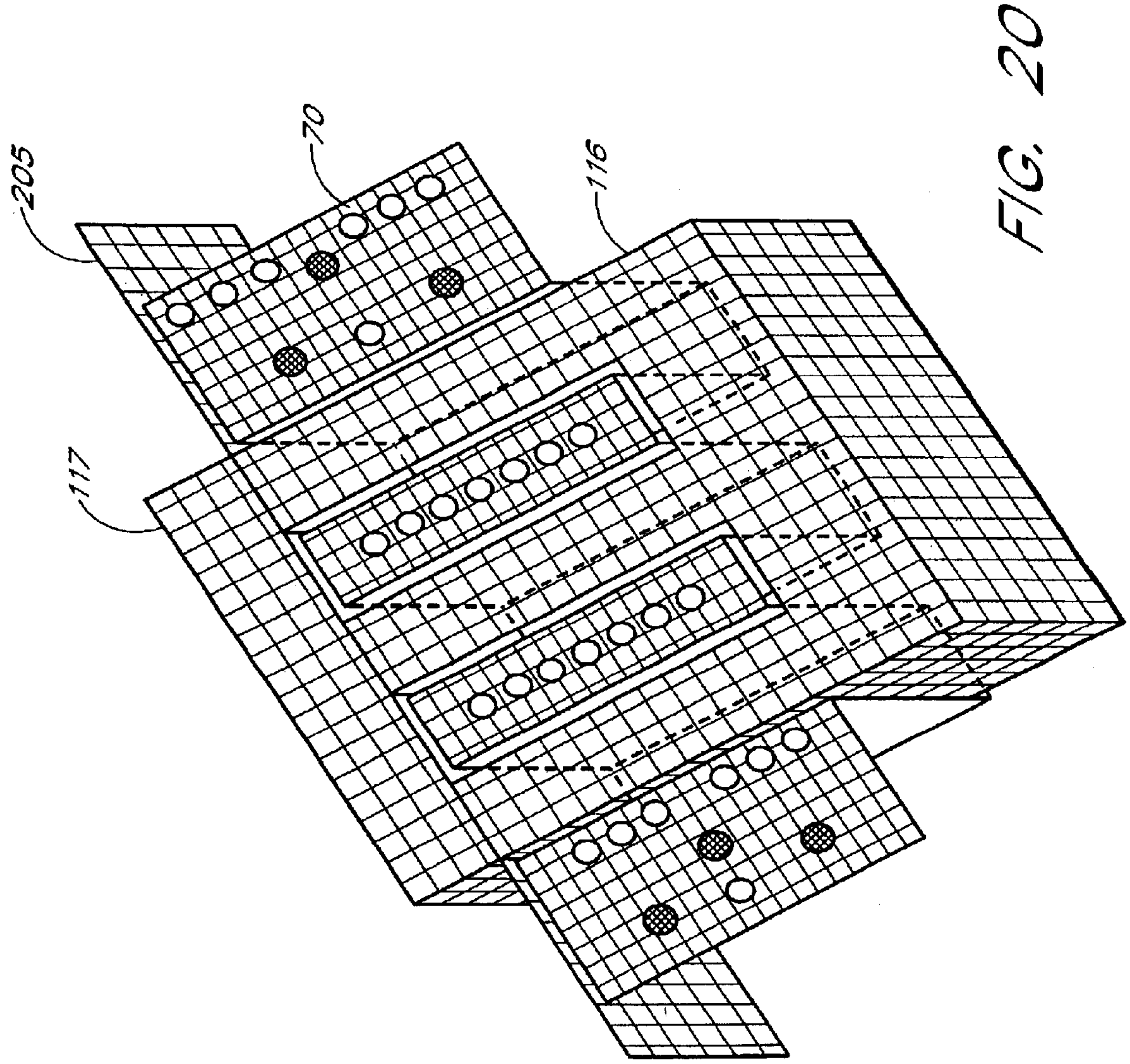
FIG. 20 is a perspective view illustrating the manner in which a two-piece E-core transformer is constructed in accordance with a preferred embodiment of the invention.

Very often an E-core as shown in FIGS. 8, 18C and 18D is chosen because of its symmetrical magnetic flux paths. This shape is easily accommodated by this invention by, as illustrated in FIG. 20, using three cavities per core instead of the illustrated two cavities. The required separation between the two core parts 116, 117 is maintained by the placement of the thin low cost film 205 along the length of the bottom flex strip 70 as shown in FIG. 20. This film can be included as part of the lamination process of the bottom flex plane.

A significant feature of the preferred embodiments of the invention is that it enables a number of transformer configurations to be economically constructed using the mass production techniques used in manufacturing flex circuits and printed circuit boards (PCB's) These construction methods can be highly tooled using automation processes. Both the bottom and top flex can be constructed as multilayer circuits of two or more levels (double sided or higher) thereby increasing the density and allowing more windings and turns in approximately the same space. Using a double-sided circuit for each increases the circuit flexibility. The additional layers will allow the individual circuit lines to connect beyond their adjacent neighbor thereby making it possible to fabricate virtual twisted pair windings or other complex arrangements.

In addition, the top flex can have many more configurations than the simple strip shown in FIG. 9B. Thus, it can be constructed so that it not only makes the connection to the bottom flex to complete the winding but it can connect to other transformers, inductors or circuits. The top flex itself can contain the circuitry for an entire functional assembly such as a DC to DC converter. It is also not necessary for the top flex to be only as wide or as long as the bottom flex. It can extend beyond the bottom flex limits in order to make other more complex connections.

Another significant feature of the invention is that heat removal from inductors and transformers constructed in accordance with this invention is both radically simplified and improved.

The preferred embodiments locate heat generating circuit paths on the outside of the final assembly. Referring, for example to FIGS. 5–7, and 13, the inductor and transformer windings are not wound on top of each other like traditional windings, nor are they stacked together like planar transformers. Instead, they are located side by side in the plane of the flex circuit. This offers superior heat dissipation with no trapped heat buried in the windings.

Figure 2A:
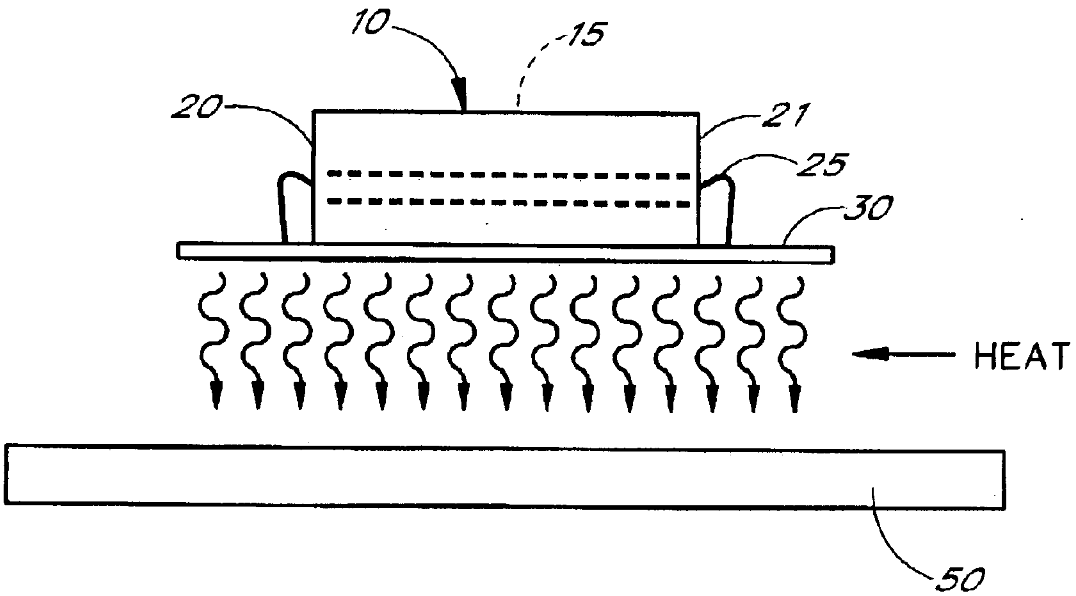
FIG. 2(*a*) is a side view schematically illustrating the heat removal advantages of the preferred embodiments of this invention.
Figure 2B:
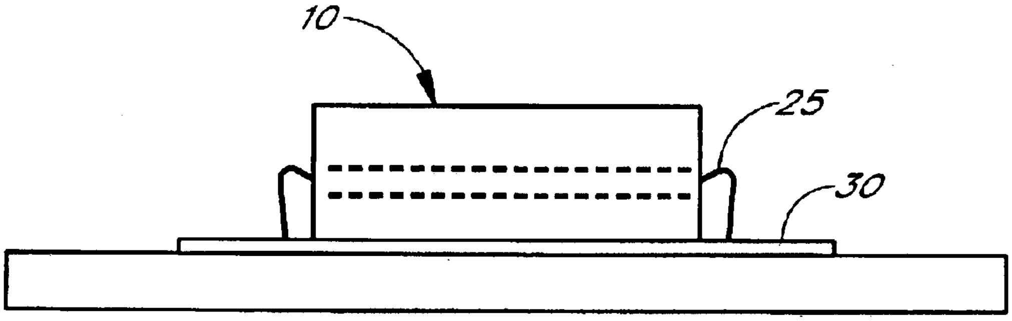

Half of the inductor and transformer windings (e.g., conductors 41 of the lower flex circuit 30 and the conductors 60*b*–65*b* of the top flex circuit 75) are located on the outside of one face of the core. Referring to FIGS. 2*a* and 3, flex circuit 30 is advantageously mounted by placing flex circuit 30 face down and directly mounted onto a thermal board 50 such as FR4 PCB or heat sink as shown in FIG. 3. Similarly, the top flex circuit 75 may be directly mounted to a heat sink. Efficient removal of heat, especially for inductors and transformers used in power supplies, and DC to DC converters, can be easily achieved. In the prior art the poor heat conducting ferrite core surrounds the circuitry trapping the heat within the transformer or inductor.

Additional features, advantages and benefits of the preferred embodiments of the invention include:

(a) In the prior art, techniques have been, developed to eliminate the hand wiring about the center post of the E-core. These products, labeled Planar Magnetic Devices, have eliminated the manual assembly required but they have limited application because of two major factors. They still, however, have limited abilities of heat removal because the technology required the poor heat conducting ferrite core to surround the heat generating circuits. Construction costs are high because the Planar devices require multiple layers (typically 6 to 12 layers) to achieve a sufficient number of turns per winding and a sufficient number of windings. To interconnect the layers expensive and time consuming copper plating processes are necessary. (The plating time is typically one hour for each 0.001 inches of plated copper.) In a typical power application copper plating thickness of 0.003 to 0.004 inches are needed making the fabrication time extensive. However, the method and the configuration of the preferred embodiments of this invention eliminate copper plating entirely and replaces this time consuming process with a much lower cost and much faster reflow soldering operation used in most of the modem day circuit assemblies. The number of layers can be reduced to two layers connected by solder pads as shown in the illustrations;

(b) In the prior art, the primary and secondary terminations require additional "lead frames" or housings to properly make the connections to external circuits. As the figures indicate, the preferred embodiments of the invention eliminate the need for separate connecting terminations by extending the copper circuits, already used to make the windings, beyond the edge of the flex material. Thus the finished assembly can be readily surface mounted in current high-density assemblies. If desired the primary and secondary Terminals can be bent to accommodate through-hole PCB's;

(c) A transformer or inductor, using the configuration shown, typically will be significantly smaller than the prior art devices. Without the need for complicated pins or lead-frames, the inductors and transformers constructed in accordance with preferred embodiments of the invention become smaller. The flex circuit windings themselves can provide the "lead frame" which can be hot bar bonded or reflowed with solder past directly to the board 50 thus reducing the footprint of the device and making more room for other components. The windings in each flex circuit can be in the same plane. Therefore, the windings of a prior art ten-layer planar device and reduced in overall height by a factor of ten in the preferred embodiment. Increased airflow across the surface of the board and decreasing package height are advantages of this invention. Since the core is turned on its side as part of the fabrication the device height will be slightly taller than the core thickness resulting in overall height reduction of as much as 300%. Height reduction is extremely important in modem day compact assemblies. By way of specific example, transformers and inductors constructed in accordance with this invention are easily constructed using a core 10 whose longest dimension is of the order of 0.25 inches.

(d) Because of the efficient method of the connections, the length of the copper circuits is significantly shorter, as well, reducing the undesirable circuit resistance and the corresponding heat loss in power circuits.

(e) The preferred embodiments provide a more efficient flux path with fewer losses than traditional transformers;

(f) The preferred embodiments of this invention are simply made using flex circuit technology and are much less expensive to manufacture than multi-layer planar windings. The preferred embodiments also eliminate the need for lead-frames thus making the preferred embodiments a very efficient transformer or inductor to manufacture.

(g) Transformers and inductors constructed in accordance with the preferred embodiments of this invention have a great many uses, particularly in miniature electronic circuits. By way of specific example, transformers and inductors constructed in accordance with this invention provide inexpensively manufactured transformers for switching power supplies for handheld computers.

What is claimed is:

1. The method of manufacturing slotted E-core inductors and transformers comprising:

forming a first plurality of side-by-side spaced discrete electrical conductors by etching a copper plane supported by a flexible dielectric material;

forming a second plurality of side-by-side spaced discrete electrical conductors by etching a copper plane supported by a flexible dielectric material;

covering said etched copper electrical conductors while leaving access holes that expose said copper conductors to provide solder pads;

separating a chain of said first plurality of spaced discrete electrical conductors;

separating a chain of said second plurality of spaced discrete electrical conductors;

folding said first plurality of spaced discrete electrical conductors to form at least three cavities;

inserting the three legs of a two-piece E-core into respective ones of said cavities so that a portion of said conductors extend into the slot of said core;

covering the ends of said three legs with the cover piece of said two-piece E-core;

locating a second plurality of spaced discrete electrical conductors over the three legs of said E-core; and bonding together respective solder paths of both the first and second chains of electrical conductors.

2. The method of manufacturing slotted core inductors and transformers comprising:

forming a first plurality of side-by-side spaced discrete electrical conductors by etching a copper plane supported by a flexible dielectric material;

forming a second plurality of side-by-side spaced discrete electrical conductors by etching a copper plane supported by a flexible dielectric material;

covering said etched copper electrical conductors while leaving access holes that expose said copper conductors to provide solder pads;

separating a chain of said first plurality of spaced discrete electrical conductors;

separating a chain of said second plurality of spaced discrete electrical conductors;

folding said first plurality of spaced discrete electrical conductors to form a cavity;

inserting one or more slot cores into said cavity so that a portion of said conductors extend into the slot of said core;

locating a second plurality of spaced discrete electrical conductors over said core or cores; and bonding together respective solder paths or both the first and second chains of electrical conductors.

3. The method of manufacturing slotted core inductors and transformers comprising:

forming a first plurality of side-by-side spaced discrete electrical conductors by etching a copper plane supported by a flexible dielectric material;

forming a second plurality of side-by-side spaced discrete electrical conductors by etching a copper plane supported by a flexible dielectric material;

covering said etched copper electrical conductors while leaving access holes that expose said copper conductors to provide solder pads;

separating a chain of said first plurality of spaced discrete electrical conductors;

separating a chain of said second plurality of spaced discrete electrical conductors;

inserting said first chains into slots of one or more slot cores so that a portion of said conductors extend into the slot of said core;

locating a second plurality of spaced discrete electrical conductors over said core or cores; and bonding together respective solder pads of both the first and second chains of electrical conductors.

* * * * *

UNITED STATES PATENT AND TRADEMARK OFFICE

CERTIFICATE OF CORRECTION

PATENT NO. : 6,796,017 B2 — Page 1 of 1

APPLICATION NO. : 10/431667

DATED : September 28, 2004

INVENTOR(S) : Philip A. Harding

It is certified that error appears in the above-identified patent and that said Letters Patent is hereby corrected as shown below:

At first page 1, column 2, (74) *Attorney, Agent, or Firm* - after Knobbe, please delete “,”.

At first page 1, column 2, line 8 of (57) ABSTRACT, please delete “continues” and insert --continuous--.

At column 8, line 42, in Claim 2 after paths please delete “or” and insert --of--.

Signed and Sealed this

Fifteenth Day of August, 2006

JON W. DUDAS

*Director of the United States Patent and Trademark Office*